US005770843A

United States Patent [19]

Rose et al.

[11] Patent Number: 5,770,843
[45] Date of Patent: Jun. 23, 1998

[54] ACCESS CARD FOR MULTIPLE ACCOUNTS

[75] Inventors: Manning I. Rose, Kettering; Lee W. Hoevel, Dayton, both of Ohio

[73] Assignee: NCR Corporation, Dayton, Ohio

[21] Appl. No.: 674,557

[22] Filed: Jul. 2, 1996

[51] Int. Cl.⁶ ........................................... G06K 5/00
[52] U.S. Cl. .................. 235/380; 235/382; 235/379; 902/31
[58] Field of Search .................. 235/380, 379, 235/381, 382; 902/30, 31

[56] References Cited

U.S. PATENT DOCUMENTS

| | | | |
|---|---|---|---|
| 3,648,020 | 3/1972 | Tateisi et al. | 902/31 X |
| 4,016,405 | 4/1977 | McCune et al. | 235/380 |
| 4,123,747 | 10/1978 | Lancto et al. | 235/380 X |
| 4,179,723 | 12/1979 | Spencer | 902/30 X |
| 4,328,414 | 5/1982 | Atalla | 235/380 |
| 4,359,631 | 11/1982 | Lockwood et al. | 902/30 X |
| 4,386,266 | 5/1983 | Chesarek | 235/380 X |
| 4,501,957 | 2/1985 | Perlman et al. | 235/379 |
| 4,837,422 | 6/1989 | Dethloff et al. | 235/380 |
| 4,965,568 | 10/1990 | Atalla et al. | 340/825.34 |
| 5,231,570 | 7/1993 | Lee | 364/408 |
| 5,251,259 | 10/1993 | Mosley | 380/23 |
| 5,305,383 | 4/1994 | Guillou et al. | 380/24 |
| 5,365,046 | 11/1994 | Haymann | 235/380 |

*Primary Examiner*—Donald T. Hajec
*Assistant Examiner*—Michael G. Lee
*Attorney, Agent, or Firm*—Gregory A. Welte

[57] ABSTRACT

A system for ascertaining identity of a customer based on a single card carried by the customer. The card bears a machine-readable code, which is transmitted to a database at a remote location. The database locates a record associated with the code, which contains one or more account numbers. Associated with each account number is a Personal Identification Number, PIN. (It is possible that all PINs are identical.) The customer selects an account number, and is asked for a PIN. If the PIN given by the customer matches that of the account number, the customer is concluded to be the valid owner of the account, and a transaction is allowed to proceed.

9 Claims, 13 Drawing Sheets

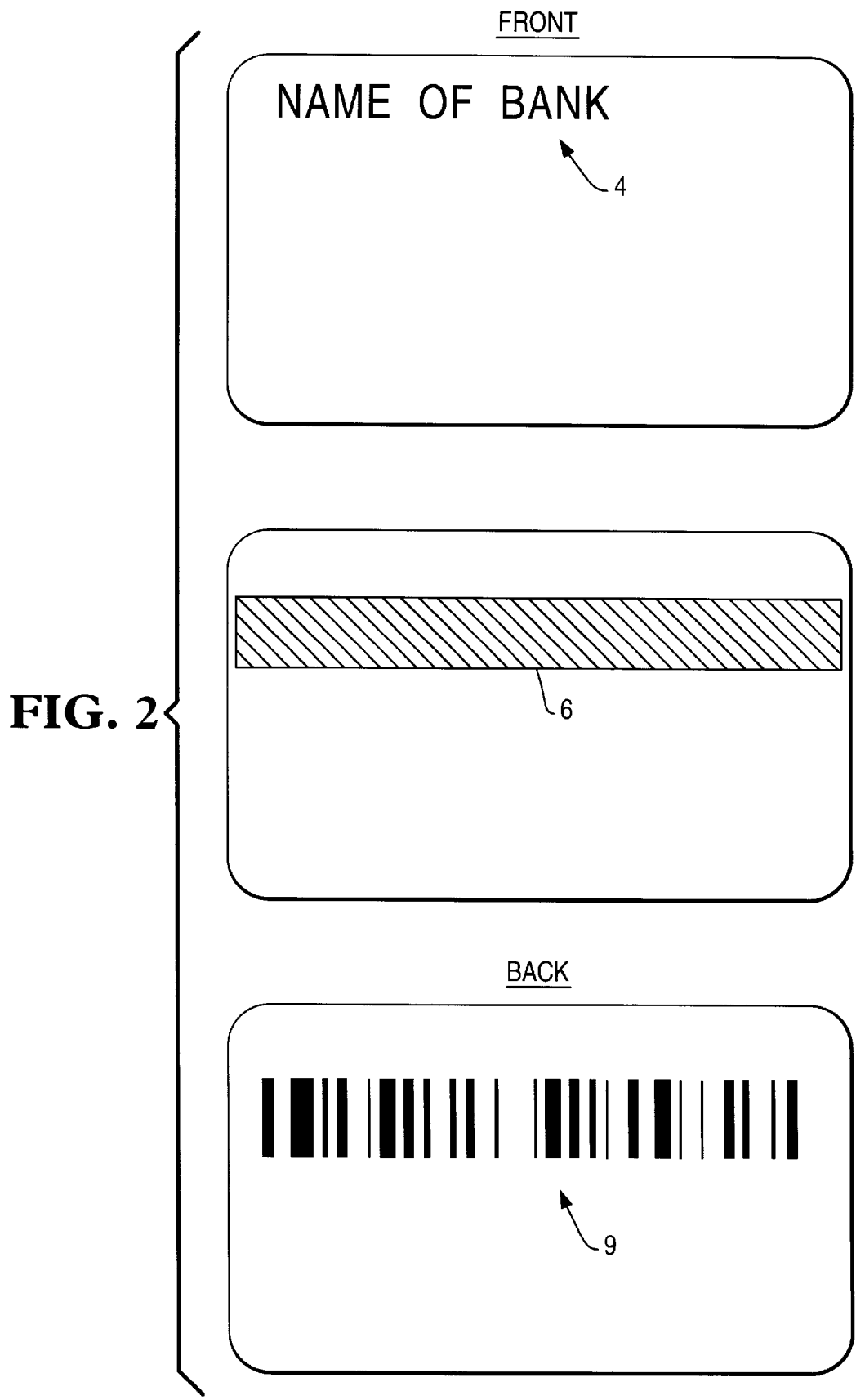

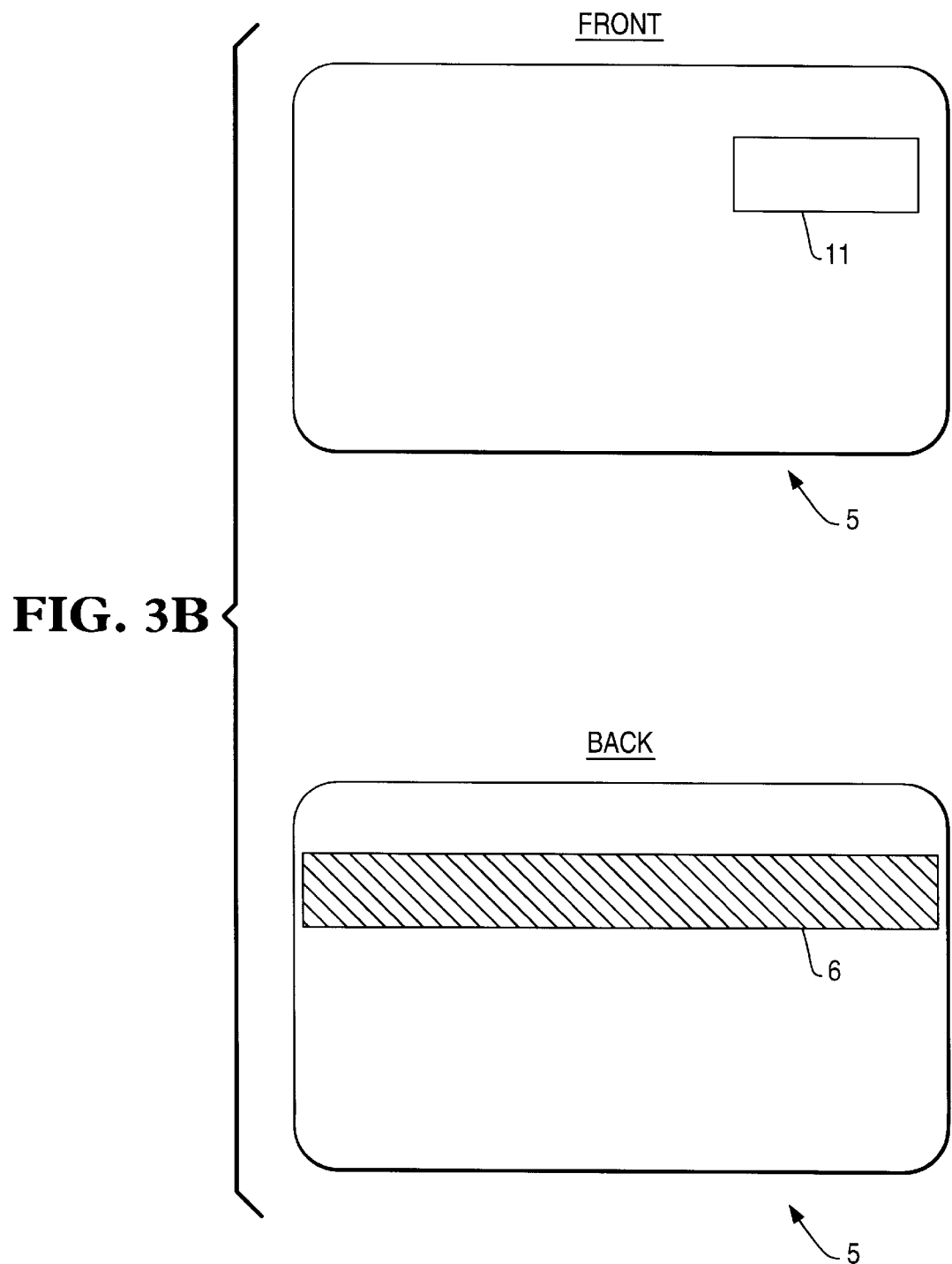

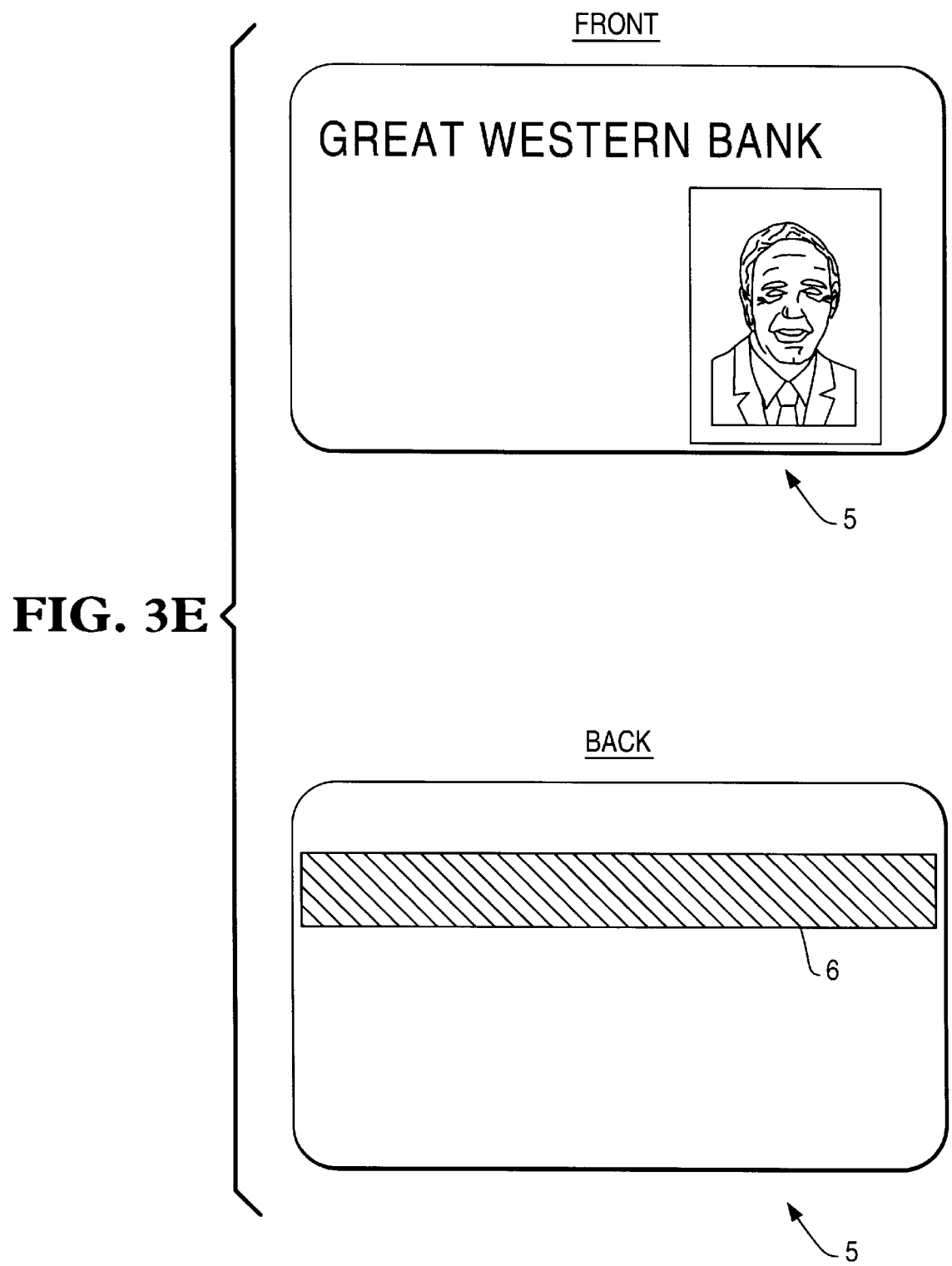

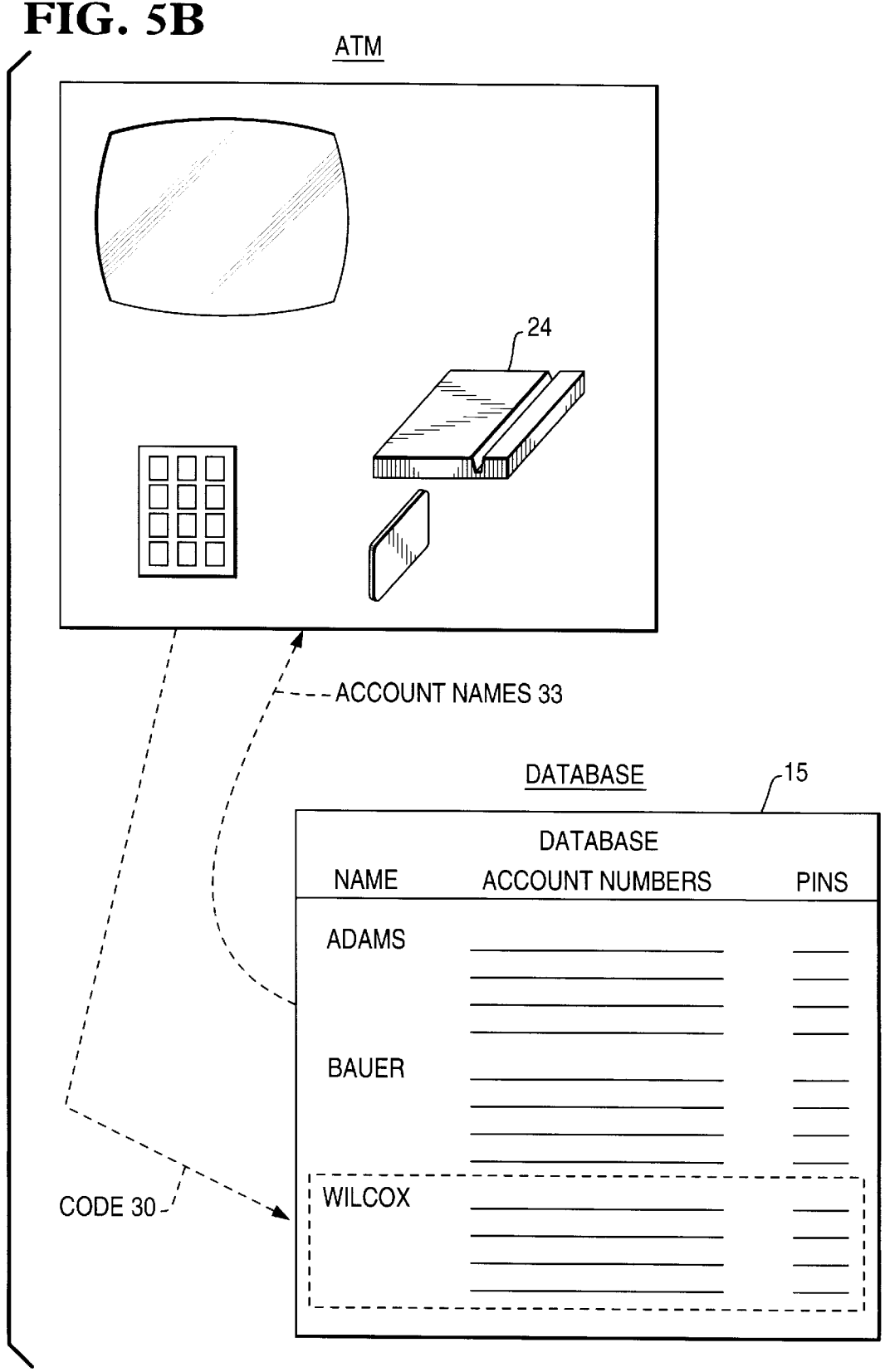

ACCESS CARD FOR MULTIPLE ACCOUNTS

The invention concerns a security system, wherein a person carries a card which contains a code which, in isolation, is meaningless. When a witness (which may take the form of an intelligent machine) wishes to confirm the person's identity, the witness causes the code to be presented to a remote database. The database looks up a personal identification number, PIN, based on the code, and presents it to the witness. If the person presents a matching PIN to the witness, the identity of the person is taken as confirmed.

BACKGROUND OF THE INVENTION

In modern society, credit cards are widely used, and many people carry several such cards in their wallets or purses. While the credit cards offer great convenience, they also pose a small, but not insignificant, risk, should they be lost. Also, the magnitude of the risk is multiplied by the number of cards lost.

A lost card can be used by an imposter to purchase goods. However, the liability of the owner of the card is limited by (a) state laws which limit losses due to lost credit cards and (b) the law of Agency and the law of Contracts, which state that the imposter has no authorization to create a contract on behalf of the card owner. Nevertheless, despite these limits on liability, society as a whole does, in fact, suffer losses due to lost credit cards, at least because some impostors successfully execute purchases before the loss of the card becomes known.

OBJECTS OF THE INVENTION

An object of the invention is to provide an improved system for credit-type financial transactions.

A further object of the invention is to provide a single card which can replace multiple cards, such as credit cards and ATM cards.

SUMMARY OF THE INVENTION

In one form of the invention, a credit card owner carries a single card, which preferably does not identify the owner by name. The card bears a code, which is used by a secure system to retrieve other codes, which represent account numbers of accounts to which the owner can charge transactions.

BRIEF DESCRIPTION OF THE DRAWINGS

FIG. 2 illustrates a single card which replaces the collection of cards of FIG. 1.

FIGS. 3A through 3E illustrate five embodiments of the card of FIG. 2.

FIGS. 5A through 5F represent a flow chart illustrating a sequence of steps by which a user executes a transaction.

DETAILED DESCRIPTION OF THE INVENTION

Figure 1:
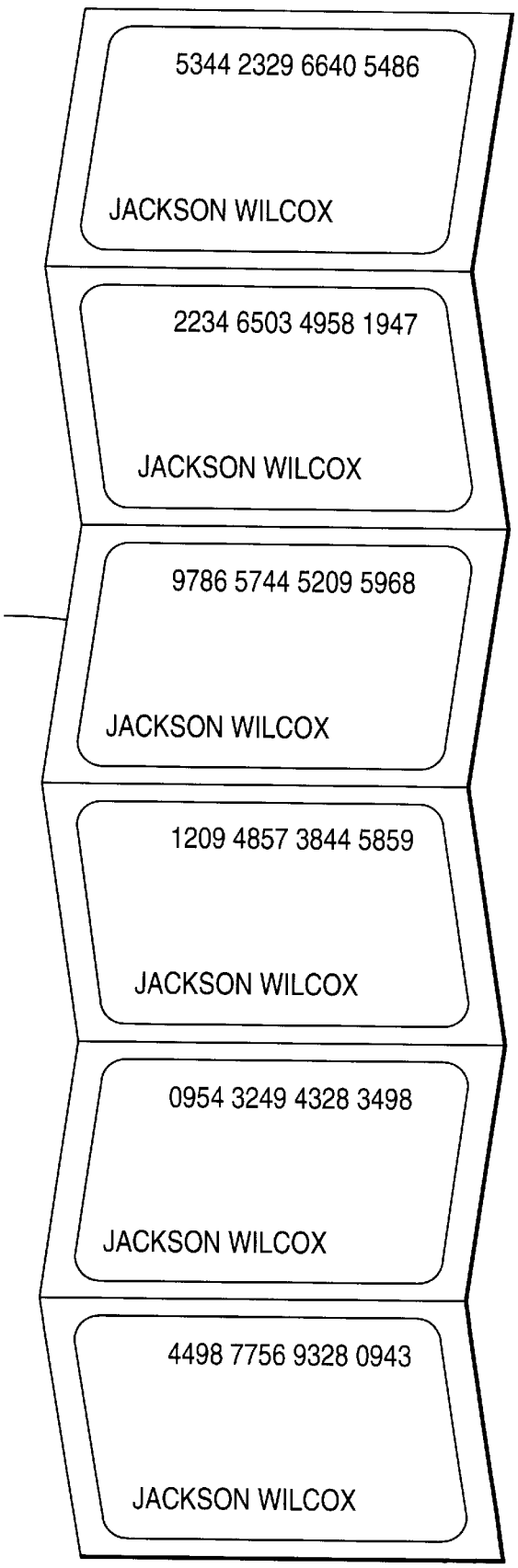
FIG. 1 illustrates a collection of credit cards which an owner may carry in a wallet.

FIG. 1 illustrates a collection of six credit cards, in a fan-fold carrier 3, which an owner may carry in a wallet. FIG. 2 illustrates a card which replaces the six cards of FIG. 1.

The card of FIG. 2 has several features. One is that the name of the card owner does not appear on the card, either in print or in machine-readable format. In an alternate embodiment, the card owner's name may appear in (a) printed or embossed form, (b) machine-readable format, or both.

Another feature is that the card may exhibit the name 4 of a bank, or financial institution, which issues the card, as indicated on the FRONT of the card. In some instances, this name may be eliminated.

A third feature is that the card bears a unique, machine-readable code, either in a magnetic stripe 6 on the BACK of the card, or in a bar code 9. Alternately, the code may be also embossed into the card.

Figure 3A:
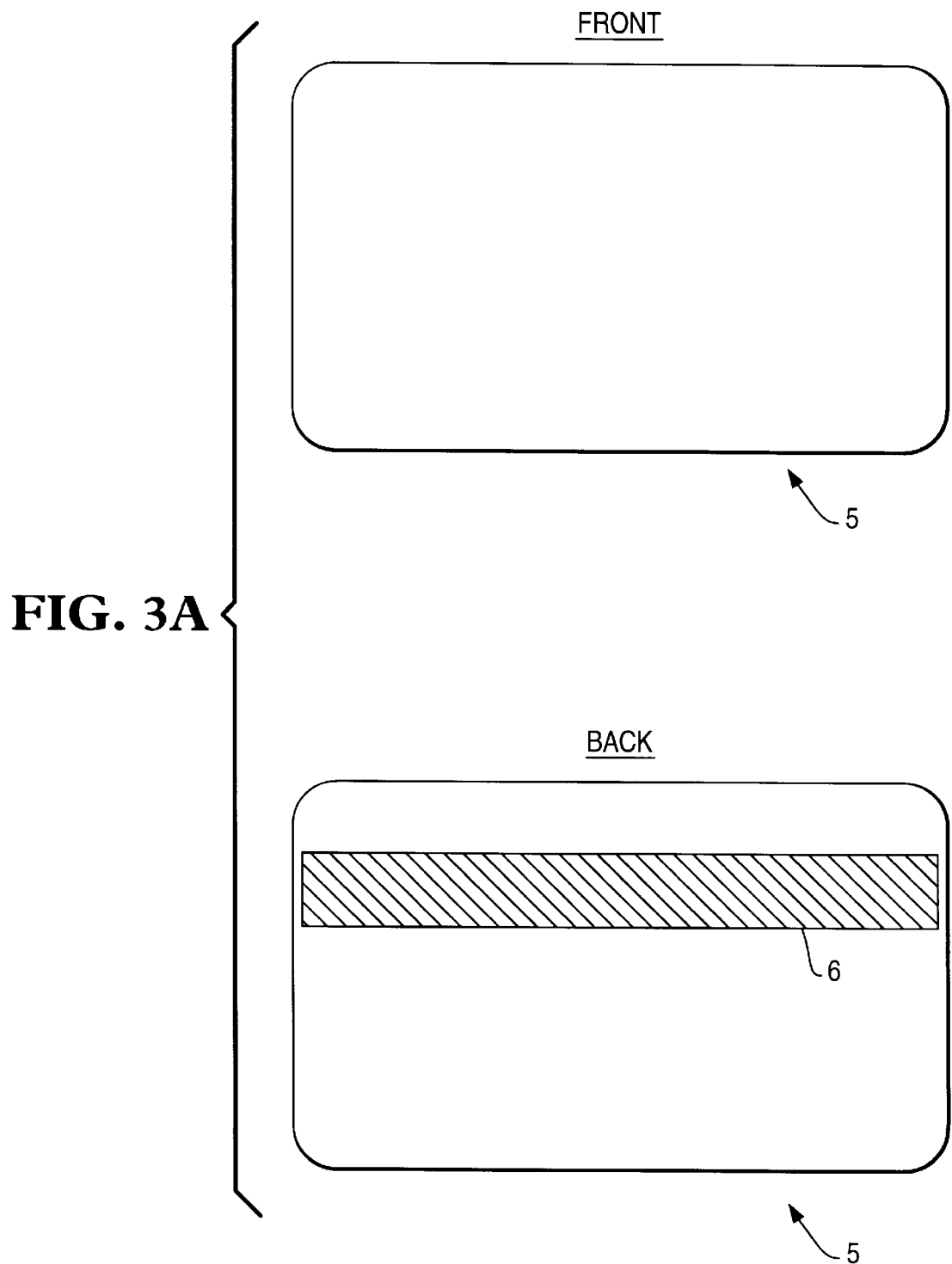

A fourth feature is that the code does not directly correspond to any account number of a credit account held by the owner. Thus, if the card is lost, a person finding the card obtains no information by which a fraudulent transaction can be undertaken. Therefore, based on the foregoing, one form of the invention takes the form of a card in FIG. 3A which is completely devoid of markings which identify either the card owner or a financial institution, but does carry a machine readable code 6. The card may be printed in a single color, such as glossy black, for a striking appearance.

Alternately, as in FIG. 3B, the card may bear a window 11 in which the card owner can write initials, or in which initials are embossed. These initials can allow the card owner to distinguish the card from those of family members.

Figure 3C:
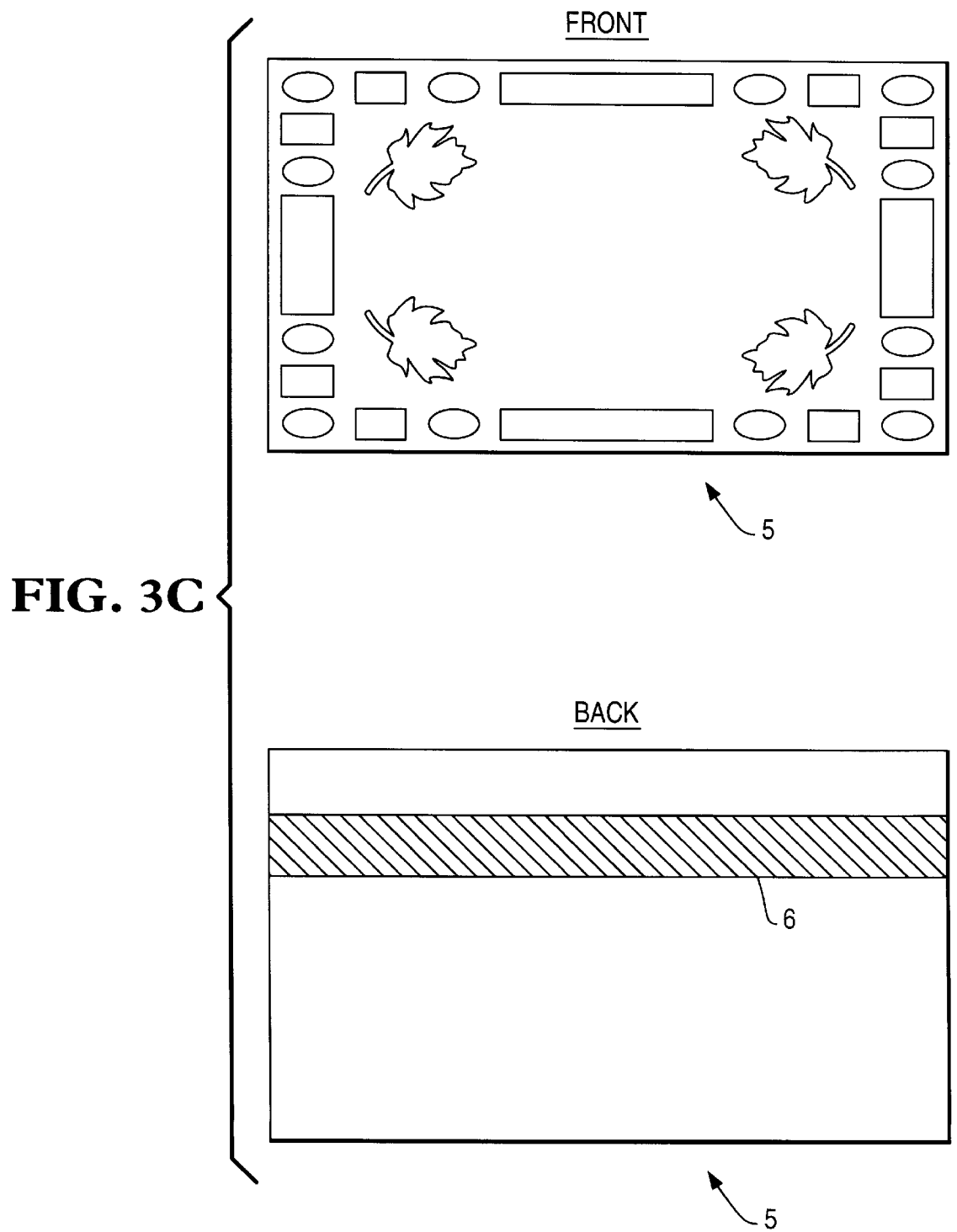
Figure 3D:
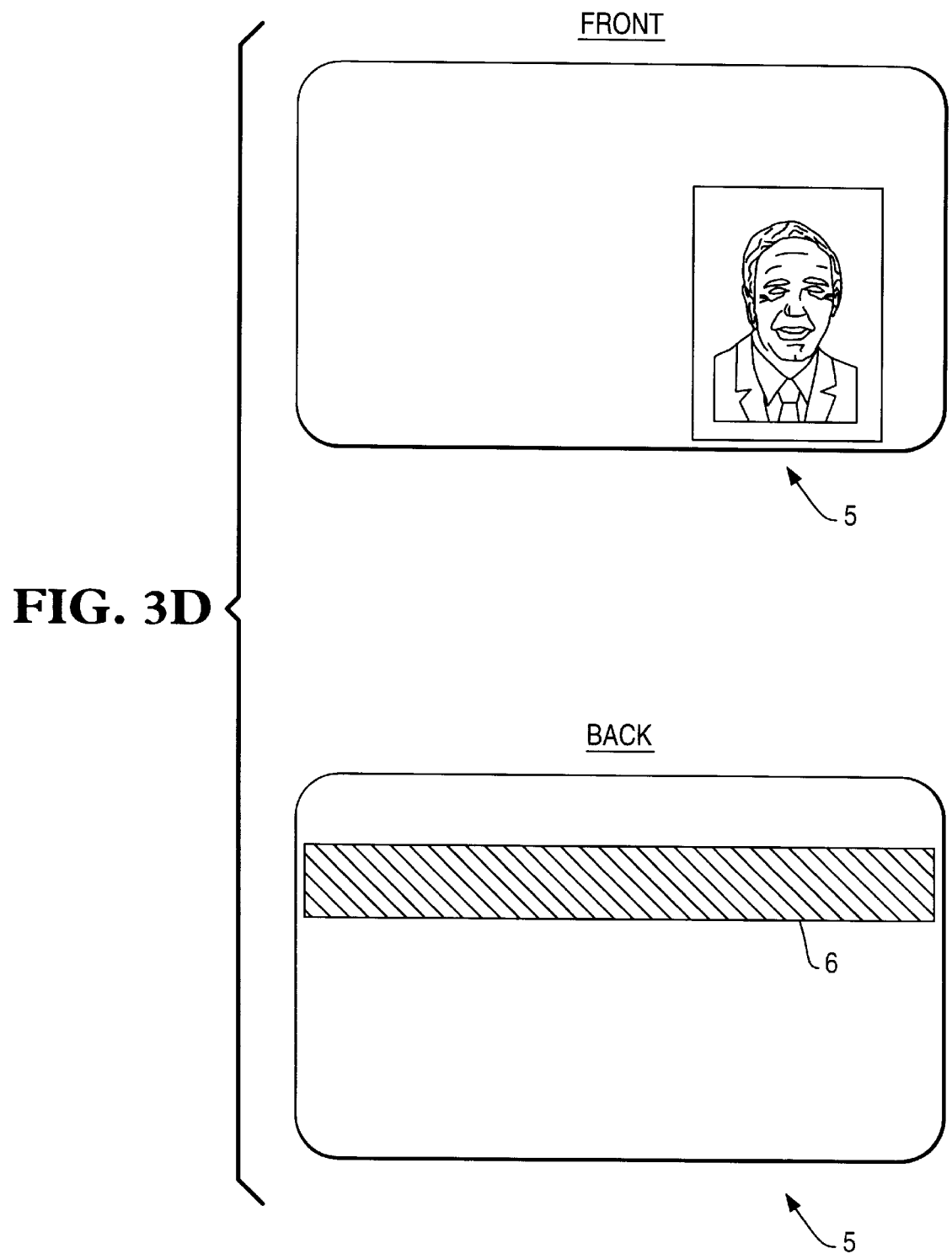

As another alternate, the card 5 in FIG. 3C may be imprinted with a graphic design, for visual appeal. As yet another alternate, the card 5 may take the form shown in FIG. 3D, wherein the card bears a photograph of its owner and a machine-readable code, but no other markings. As still another alternate, the card 5 of FIG. 3E may also contain markings which identify a financial institution.

In all of the FIGS. 3A through 3E, the card bears no markings which allow a stranger who finds the card, if lost, to identify the card owner.

Figure 4:
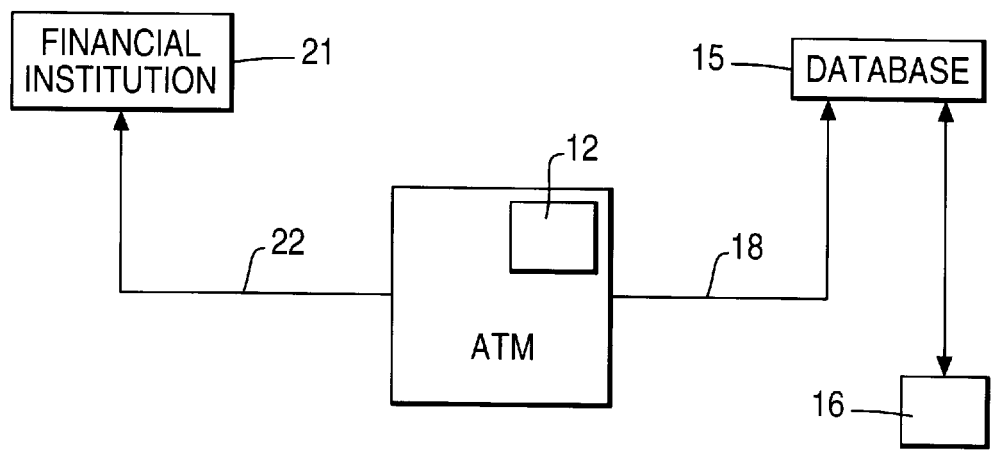
FIG. 4 illustrates an architecture of one form of the invention.

FIG. 4 illustrates a system by which the card may be used to execute a transaction. An ATM (Automated Teller Machine), or other self-service kiosk, accepts the card and reads the machine-readable code. A data retrieval system 12 contacts a remote database 15, by a secure telephone line 18, and fetches an account number of a credit account, or bank account, held by the card owner. Assuming the fetched account number represents a bank account, the ATM contacts another financial institution, such as institution 21, by way of telephone line 22, and executes a transaction, such as a cash withdrawal. From one point of view, the fetched number is equivalent to that carried on an ordinary credit card, and allows an ATM transaction to occur in the ordinary manner.

The sequence of events just described is illustrated in greater detail in FIG. 5. FIG. 5A shows a card reader 24 at an ATM, and a card owned by Wilcox, about to be swiped through the reader. The remote database 15 is also shown.

In FIG. 5B, the card has been swiped through the reader, the code has been read, and transmitted to the remote database 15, as indicated by arrow 30. The database 15 locates the record for the card owner, which is Wilcox in this example. (The name "Wilcox" in the database is shorthand notation for the code read from the card. In actual practice, the records within the database will be classified according to the codes, rather than the names of the card owners, although the latter is certainly possible.)

Now, the account numbers (indicated in the center column of the database 15) of Wilcox become known. The names of the accounts are transmitted to the ATM, as indicated by arrow 33. Examples of the names would include the name of a department store, name of a gasoline refining company, and so on.

Figure 5A:
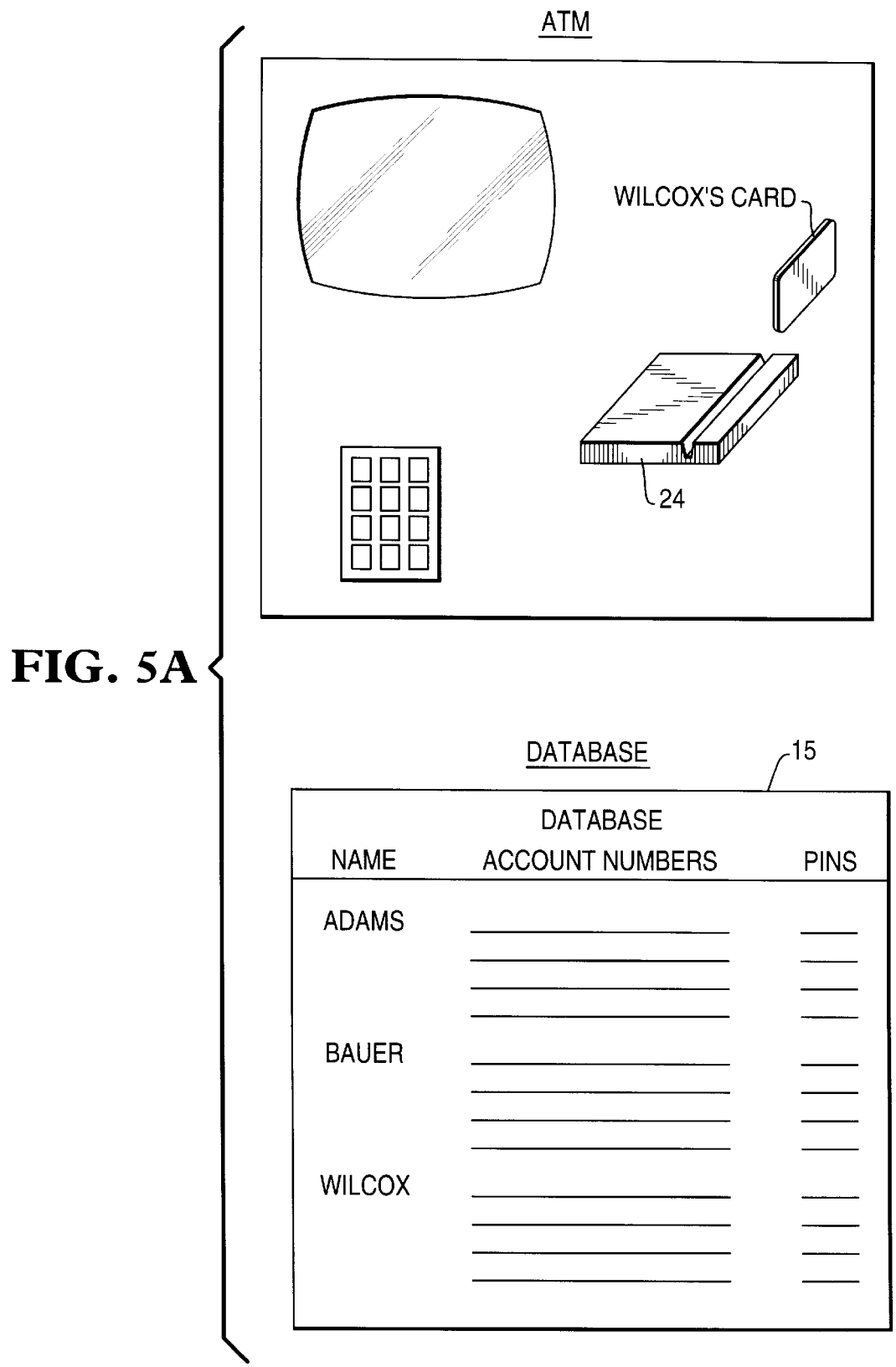
Figure 5C:
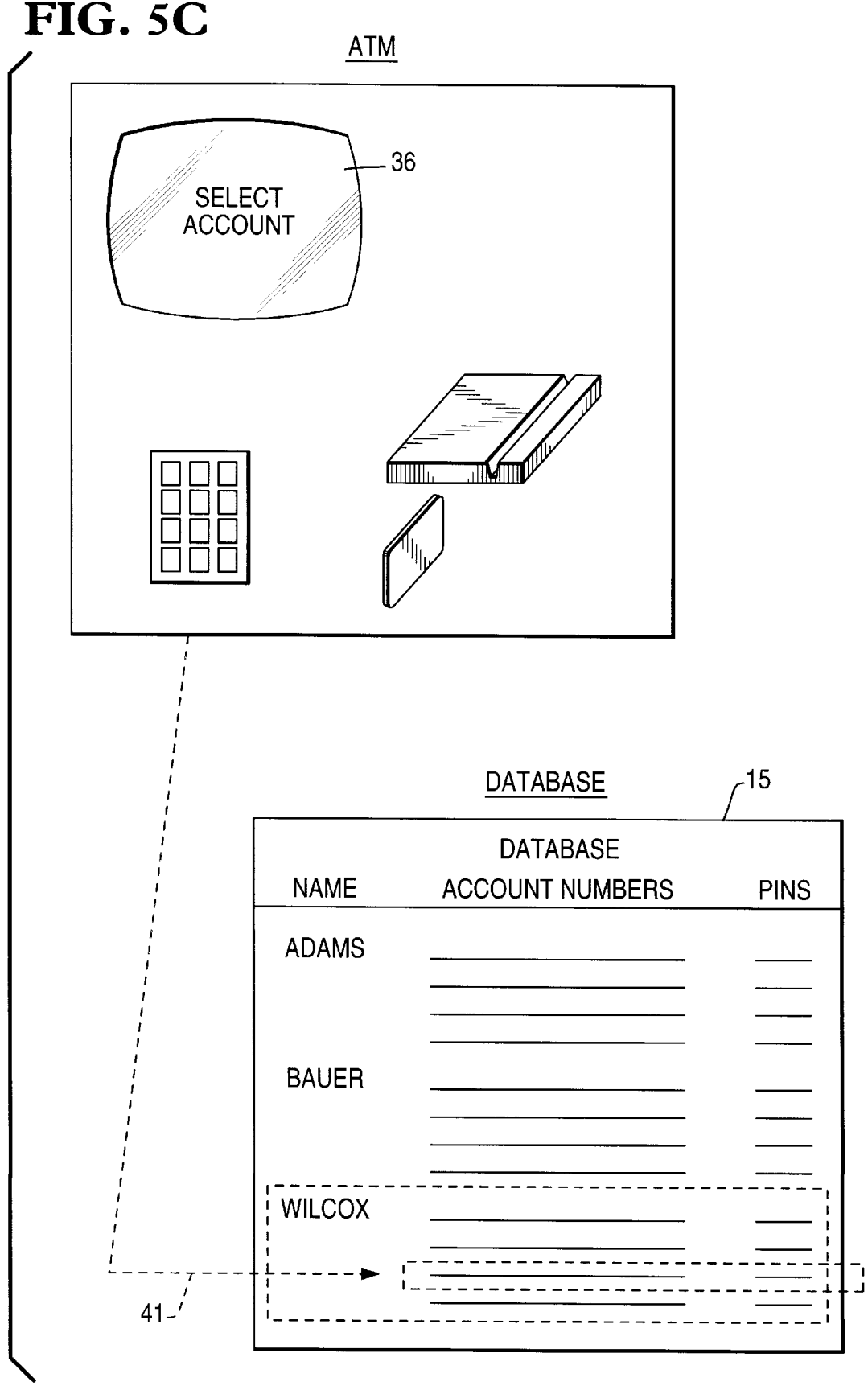
Figure 5D:
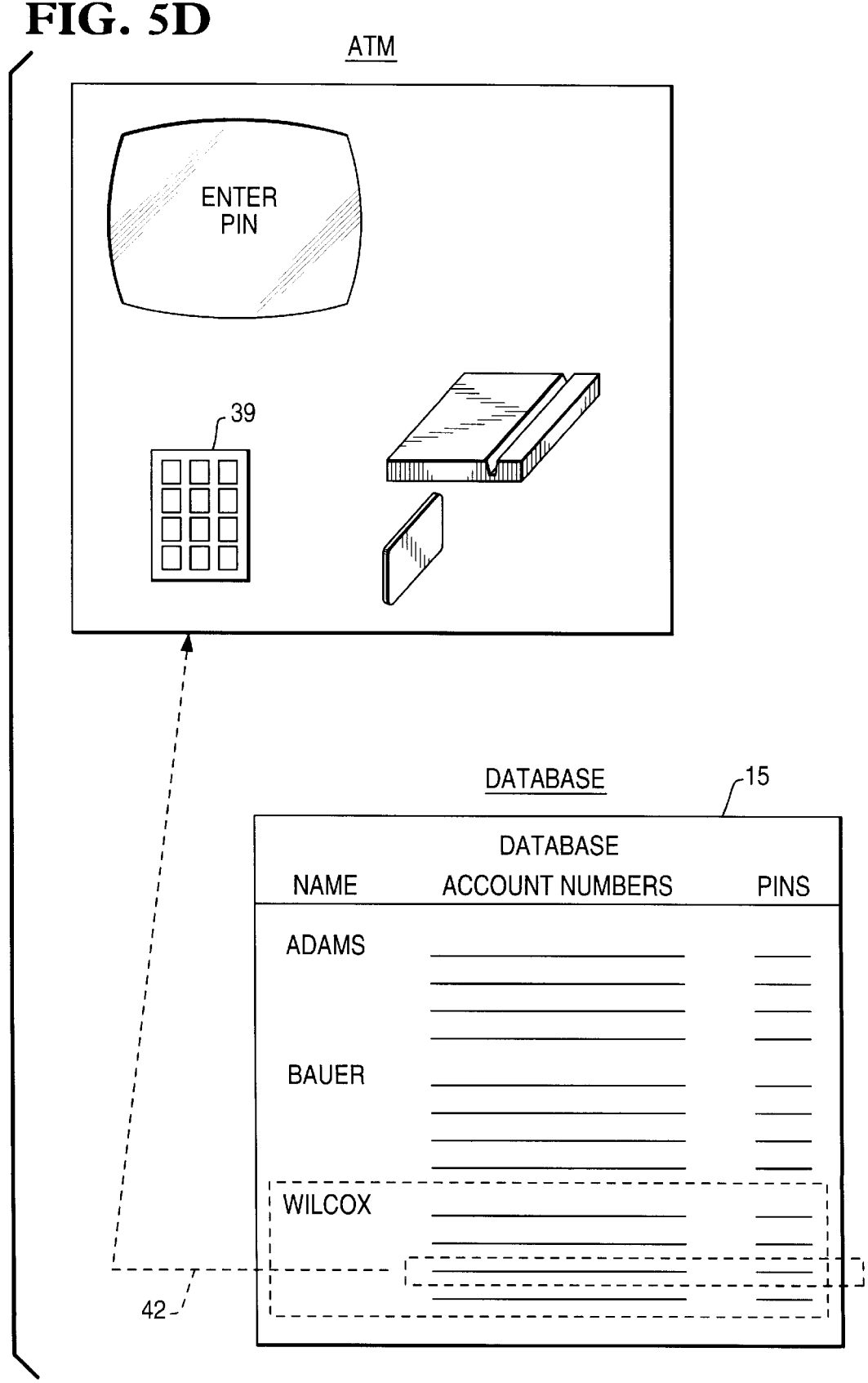
Figure 5E:
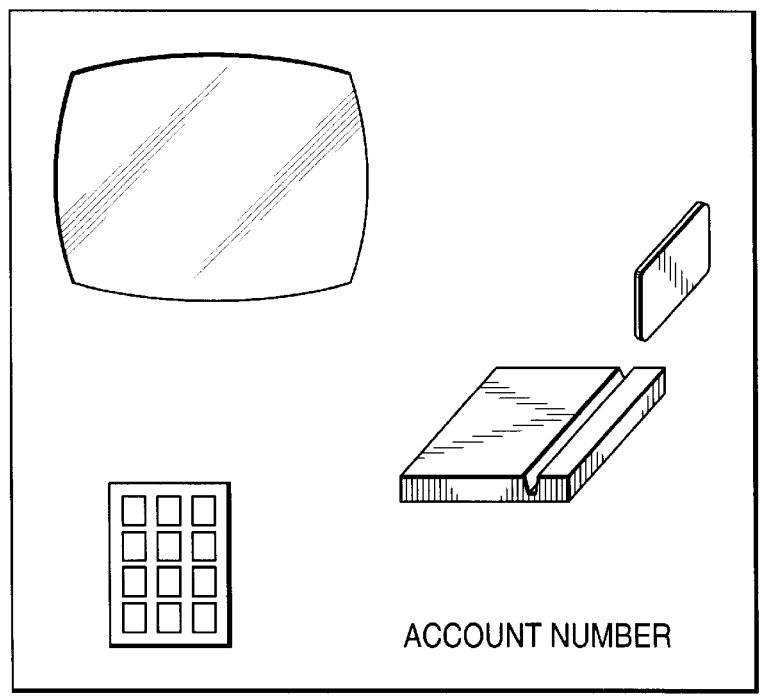
Figure 5F:
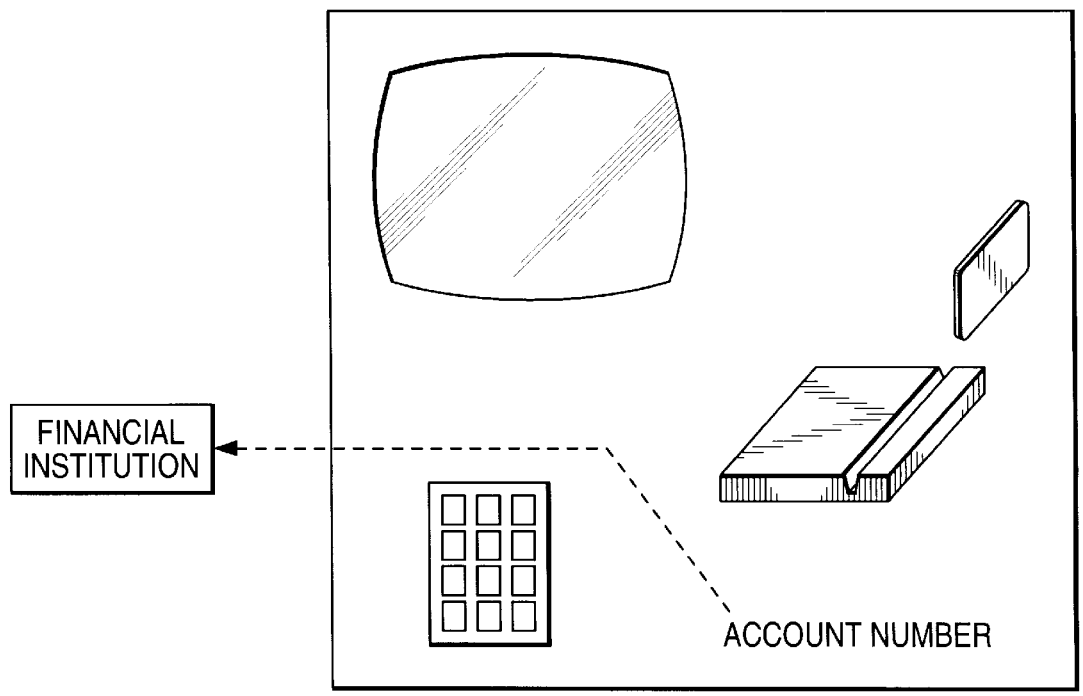

The names of the accounts are listed on a video display 36 associated with the ATM, and the user is prompted to select one of the names, as in FIG. 5C. When the user selects the name of an account, as indicated by arrow 41, the invention locates the Personal Identification Number, PIN, associated with that account, and stored in the database 15, as indicated by the right-hand column.

The invention prompts the owner to enter the PIN, using keypad 39. If entered PIN matches that within the database 15, the account number is released to the ATM, as indicated by arrow 42 in FIG. 5D. Now the ATM is in possession of the ACCOUNT NUMBER, indicated in FIG. 5E.

The ATM uses this account number in a manner similar to account numbers which are read from a card presented to the ATM itself. For example, as in FIG. 5F, the ATM can transmit the account number to a financial institution, such as a bank owning the ATM, for a standard ATM transaction, such as a cash withdrawal.

Figure 6:
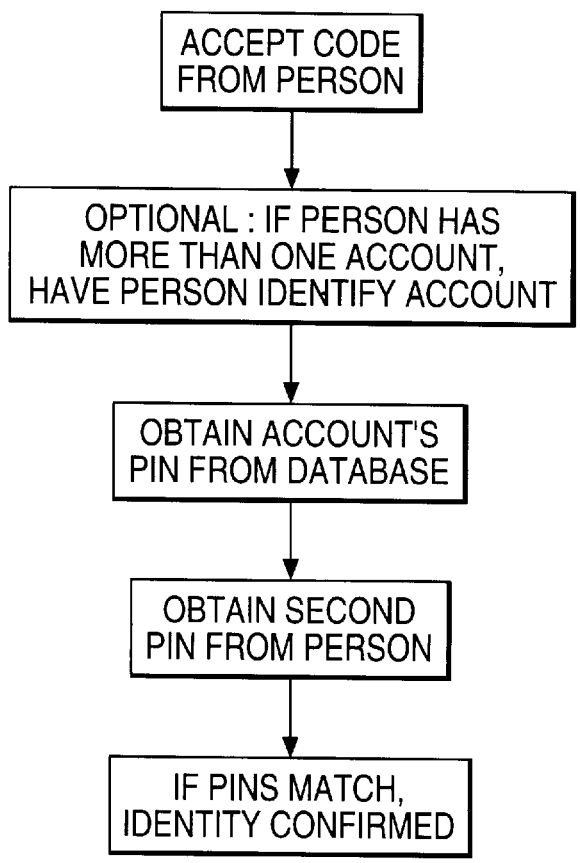
FIG. 6 illustrates logic implemented by one form of the invention.

FIG. 6 is a flow chart illustrating logic implemented by one form of the invention, and is considered self-explanatory.

ADDITIONAL CONSIDERATIONS

1. The discussion above was framed in terms of an ATM. However, the owner of a card is not restricted to dealing with machines, but the procedure described in FIG. can be undertaken when the card owner purchases merchandise or services. For example, the card reader 24 in FIG. 5A can be located at a check-out station of a retail store. The steps described in connection with FIGS. 5B through 5F are undertaken as in the discussion above.

A person operating the check-out station may perform some of the functions undertaken by the ATM of FIG. 5. For example, the person may ask the customer to identify an account, and pass that information to the database. As another example, when the database returns a PIN, the person may read the PIN, and ask the customer to confirm it.

Alternately, automated equipment, such as that contained within the ATM, can perform some, or all, of these functions.

Ordinarily, when a customer makes a credit-card purchase at a retail establishment, the establishment requests confirmation of validity of the credit card from the issuer of the credit card. In doing so, the establishment is required to identify itself, by providing its "store number," whereupon the establishment is given a transaction number, which is used to identify the purchase. In general, the customer's PIN number is not required to obtain the transaction number, but could be, in some situations.

2. When ATMs communicate with financial institutions, as by telephone line 22 in FIG. 4, the telephone line used is a private line. Such lines allow the ATM to call only the institution assigned to it, and the institution to call only the ATMs assigned to it. Third parties cannot call either the ATM or the financial institution using such lines.

Similar lines may be used as line 18 in FIG. 4, when the ATM calls the database 15. Alternately, ordinary telephone lines can be used, but with suitable encryption techniques implemented.

3. The order of the steps in which (a) the customer selects an account number, (b) the account number is delivered by the database, (c) the PIN number is delivered by the database, and (d) the PIN delivered is compared with the PIN keyed in by the customer is not necessarily important. One reason is that the database and the ATM can be viewed as a single operative entity in this context.

That is, for example, to minimize telephone connection time, as soon as the ATM delivers the code taken from the customer's card, the database can deliver all account numbers and the respective PINs to the ATM, and then terminate the telephone connection. At this time, the ATM is in possession of the PINs required to verify the customer's identity, and the account numbers to which to charge a transaction, should the identity be verified.

Other sequences of delivering the data by the database can be envisioned.

4. In one form of the invention, a conclusion is reached as to the identity of the customer. That is, when the customer provides a PIN which matches that associated with an account number stored in the database, the customer is deemed to be an authentic owner of that account. The conclusion can be either expressly acknowledged, as by a cashier stating "Mr. Wilcox, your identity has been verified," or tacitly acknowledged, by proceeding with the transaction, under the assumption that the customer is actually Mr. Wilcox.

7. The code contained within the magnetic stripe 6 is actually a set of signals. This set of signals, when delivered to the card reader 24 in FIG. 5B, and thence to database management software 16 in FIG. 4, cause the software 16 to fetch the account numbers and PINs, shown in FIG. 5D, which are associated with the code.

Thus, the code acts as a key to unlock and release the account numbers and the PINs. In principle, the code is no different than a key which unlocks a strongbox which contains the database 15 in FIG. 5D in a paper format.

Further, the code should not be viewed as, or confused with, numbers, or other alphanumeric characters. The code, contained in the magnetic strip 6, is a physical entity, which induces physical actions, when acted upon by a physical device, such as the card reader 24.

Representing the code as a string of numbers merely presents the code in human-understandable form, which is necessary for a human to read the code, because a human cannot directly read the signals on the magnetic stripe 6.

By analogy, a human cannot directly listen to radio waves. An intermediary device, the radio, is required. Similarly, the human cannot directly read the magnetic stripe 6. An intermediary representation is required, namely, the number string on paper.

Restated, representing the code as a string of numbers actually converts the code into a different form. The code, in this different form, is ineffective to act as a key.

By another analogy, a paper printout of computer code is commonly called "software," but such nomenclature is incorrect. "Software" must exist in a form which is readable by a microprocessor, and readable at the speeds at which the microprocessor operates. A paper representation of software is merely a human-understandable representation of software, and is not actually software, because it cannot run on a microprocessor.

6. Definitions. "Wallet-sized" refers to a size which can conveniently fit into a standard men's wallet. One example of a "wallet-sized" object is a card measuring 3.4×2.1 inches, and 0.030 inches thick. Embossing on such a card may add another 0.020 inches, making the overall thickness 0.050 inches.

Numerous substitutions and modifications can be undertaken without departing from the true spirit and scope of the invention. What is desired to be secured by Letters Patent is the invention as defined in the following claims.

We claim:

1. In a self-service kiosk, the improvement comprising:
   a) code-accepting means for accepting a code from a user;
   b) means for
   i) contacting a remote database, and
   ii) retrieving a plurality of account numbers from said database which are associated with said codes
   iii) retrieving a Personal Identification Number. PIN, for each account number;
   iv) presenting said account numbers to the user;
   v) prompting the user to select an account number;
   vi) prompting the user to enter a PIN for the selected account number; and
   vii) if the PIN entered matches that associated with the selected account number, transmitting the selected account number to a system which is different from said remote database.

2. Improvement according to claim 1 in which said code is carried by a wallet-sized card in machine-readable format.

3. Apparatus according to claim 1, in which
   i) said code-accepting means reads said code from a wallet-sized card, and
   ii) said card is devoid of all symbols, readable either by said code-accepting means or humans, which identify either an institution issuing the card or a person.

4. A method of ascertaining identity of a person at a kiosk, comprising the following steps:
   a) accepting a card from the person, which bears a machine-readable code;
   b) using said code, retrieving
      (i) a plurality of Personal Identification Numbers, PINs, and
      (ii) a plurality of account numbers, each being associated with a respective PIN.
   from a database situated at a first remote location;
   c) accepting a personal PIN from said person;
   d) at the kiosk, comparing said personal PIN with one, or more, of said plurality of PINs: and
   e) if the personal PIN matches that associated with one of said account numbers transmitting that account number to a system located at a second remote location.

5. Method according to claim 4, and further comprising the step of concluding that said person's identity is confirmed, when the PINs are found to match.

6. Method according to claim 4 and further comprising the step of retrieving an account number from said database, based on said code.

7. Method according to claim 6, and further comprising the step of applying a monetary charge to an account represented by said account number.

8. Method according to claim 4, in which said card is
   i) wallet-sized and
   ii) devoid of all symbols, both machine-readable and human readable, which identify either an institution issuing the card or a person, thereby preventing said kiosk from obtaining access to such symbols through the card.

9. A method of ascertaining identity of a person who is undertaking a transaction, comprising the following steps:
   a) accepting a card from the person
      i) on which resides a machine-readable number, and
      ii) which contains no information identifying its owner or a system issuing the card;
   b) transmitting said code to a remote database;
   c) receiving, from said database, a plurality of account numbers, each associated with a respective PIN;
   d) accepting a personal PIN from said person;
   e) inquiring whether said personal PIN matches at least one of said plurality of PINs; and
   f) if a match of PINs is found, transmitting the account number associated with the matching PIN to a remote system, which is different from the remote database.

* * * * *

UNITED STATES PATENT AND TRADEMARK OFFICE
CERTIFICATE OF CORRECTION

PATENT NO.   : 5,770,843
DATED        : June 23, 1998
INVENTOR(S)  : Manning Rose et al.

It is certified that error appears in the above-indentified patent and that said Letters Patent is hereby corrected as shown below:

Column 5, line 11, delete "codes" and substitute --code;--.

Signed and Sealed this

Seventh Day of March, 2000

Attest:

Attesting Officer

Q. TODD DICKINSON

Commissioner of Patents and Trademarks